Aug. 26, 1924.
L. W. WITRY ET AL
1,506,707
TRACTOR CONTROL DEVICE
Filed Dec. 2, 1922
3 Sheets-Sheet 3
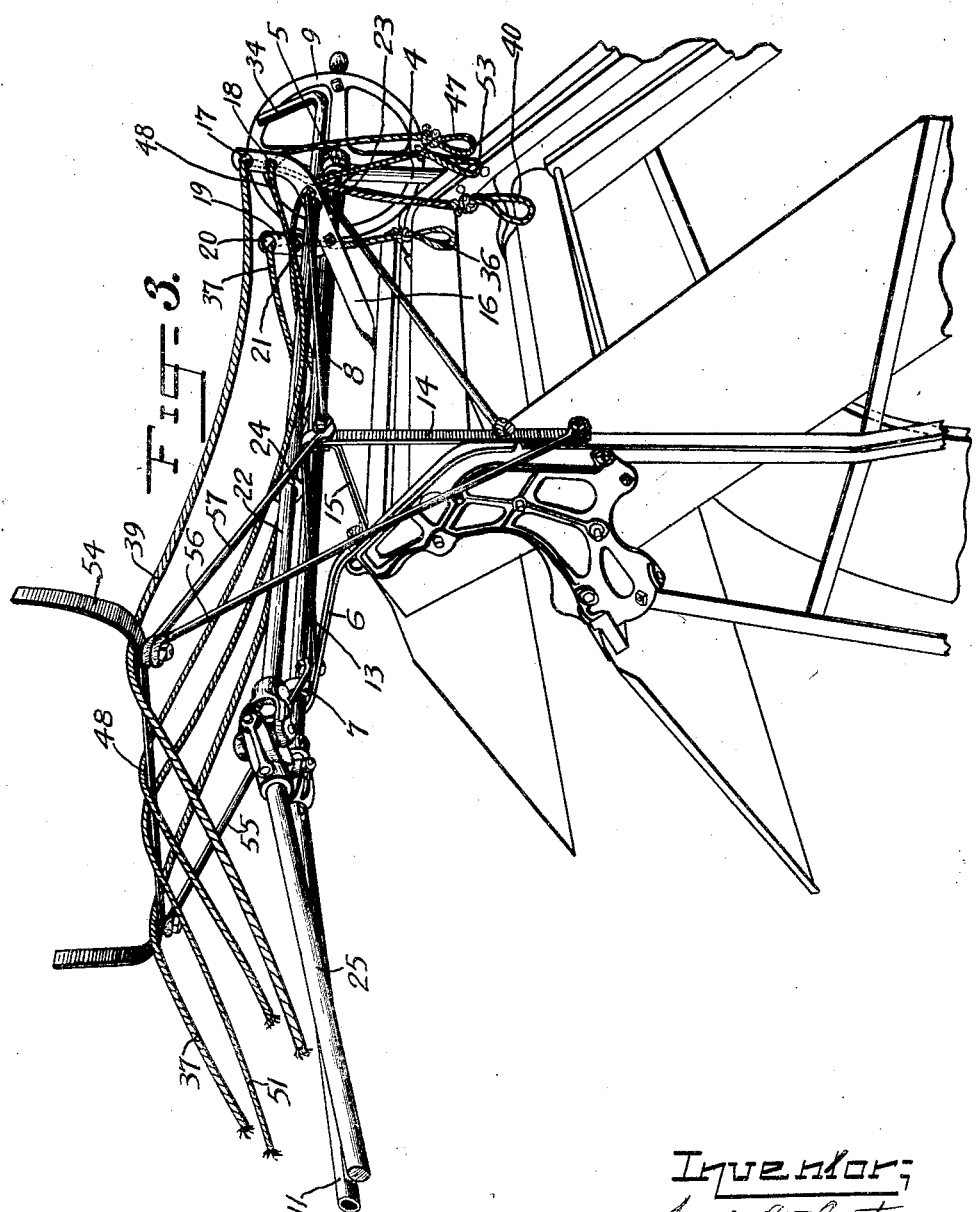

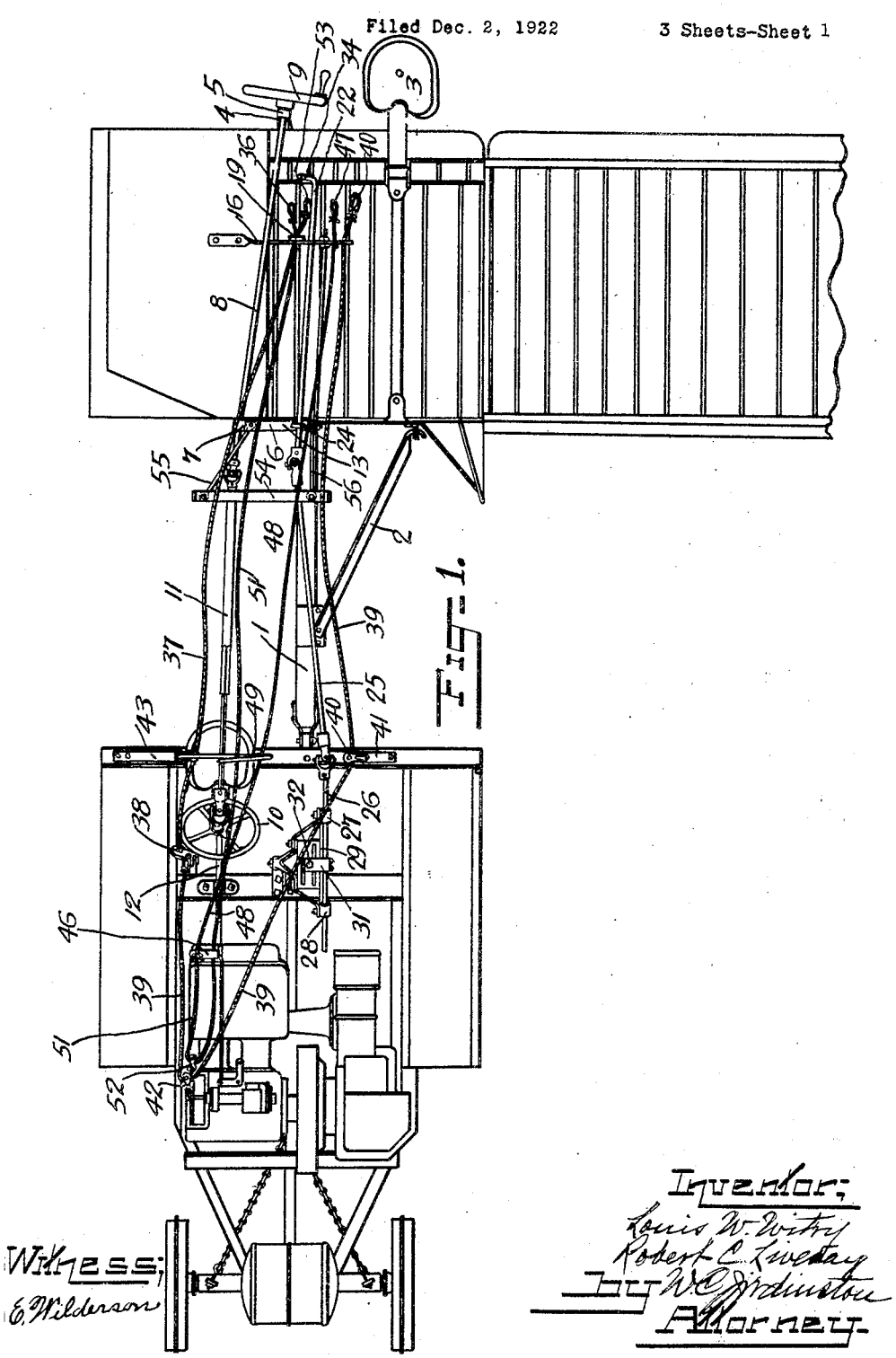

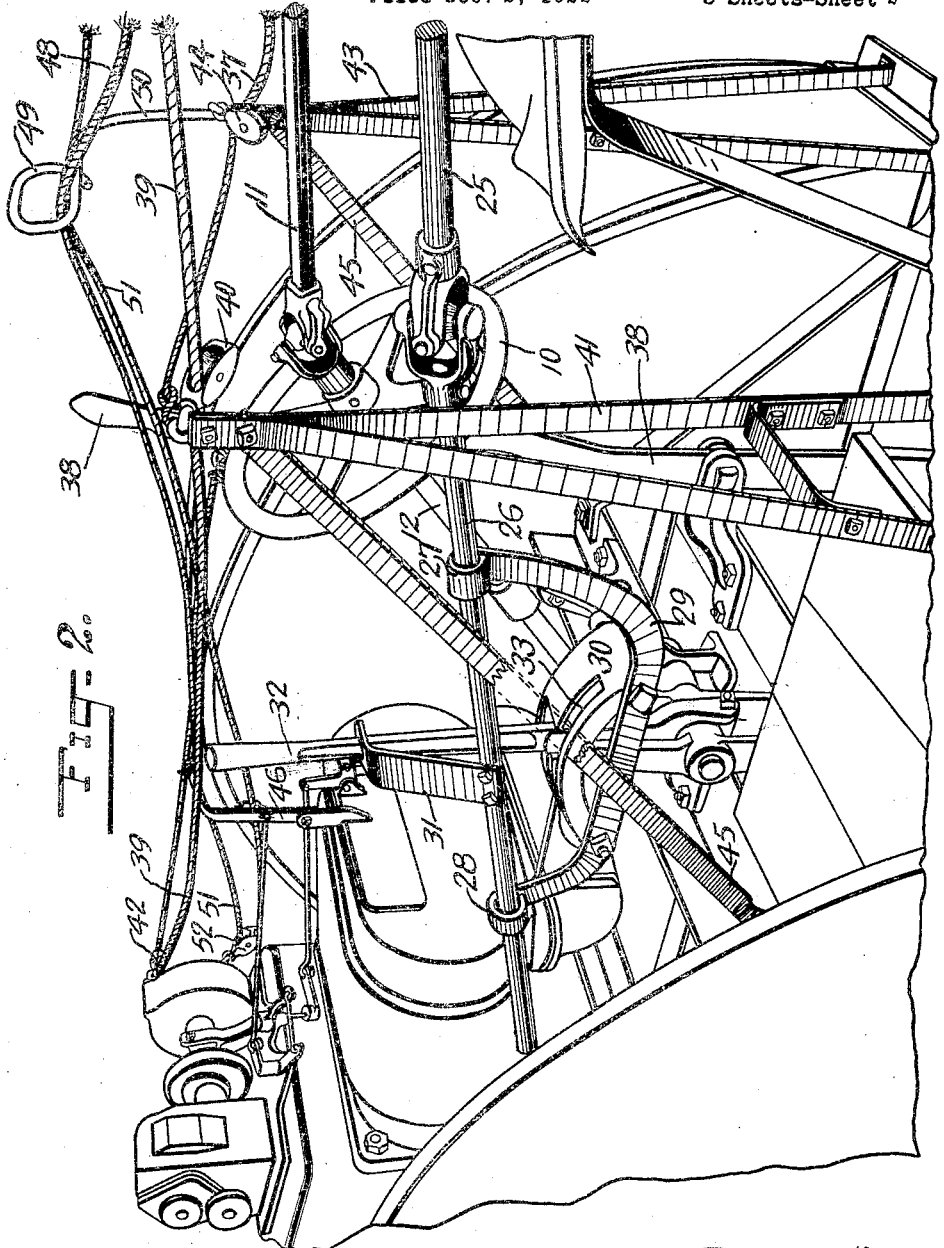

Patented Aug. 26, 1924.

1,506,707

UNITED STATES PATENT OFFICE.

LOUIS W. WITRY, OF WATERLOO, IOWA, AND ROBERT C. LIVESAY, OF MOLINE, ILLINOIS, ASSIGNORS TO DEERE & COMPANY, OF MOLINE, ILLINOIS, A CORPORATION OF ILLINOIS.

TRACTOR CONTROL DEVICE.

Application filed December 2, 1922. Serial No. 604,565.

*To all whom it may concern:*

Be it known that LOUIS W. WITRY and ROBERT C. LIVESAY, citizens of the United States, residing, respectively, at Waterloo, county of Blackhawk, State of Iowa, and Moline, county of Rock Island, State of Illinois, have invented certain new and useful Improvements in Tractor Control Devices, of which the following is a specification, reference being had therein to the accompanying drawing.

Our invention relates to tractors and specifically to control connections between the tractor and a machine or vehicle drawn thereby, and the object of our invention is to provide a controlling means readily operable from a driver's position on a machine coupled to the tractor.

Referring to the drawings in which similar numerals indicate identical parts—

Figure 1 is a plan view of a tractor and harvester coupled together and embodying our invention. Figure 2 is an enlarged fragmentary view in perspective illustrating the application of our device, and Figure 3 is an enlarged fragmentary view in perspective illustrating the parts of our invention mounted on the harvester.

The harvester is attached to the tractor by a stub tongue 1 reinforced by a brace 2, and is provided with a seat 3 mounted in the usual place and manner. Adjacent the seat 3 is a post 4 rigidly secured on the rear of the harvester and provided at its upper end with a bearing 5. A bracket 6 is mounted on the front of the harvester and carries a bearing 7. Journaled in the bearings 5 and 7 is a steering rod 8 provided with a hand wheel 9 convenient to the seat 3. The forward end of the rod 8 is connected with the steering wheel 10 of the tractor by a Cardan joint 11, which is telescopic for flexibility of the steering device when the tractor and attached machine is making a turn. The steering wheel 10 is mounted on a rotatable shaft 12 connected in a desired manner to the steerable wheel mechanism of the tractor.

The bracket 6 is provided with a part 13 substantially horizontal and preferably integral with a part 14 which extends downwardly and is rigidly secured to the frame of the harvester and reinforced by a brace 15. A support 16 is rigidly secured on the harvester with its free end bent upwardly and provided with holes 17 and 18. An upstanding arm 19 is rigid on the support 16 and is provided with holes 20 and 21. A rod 22 is slidably mounted in a hole 23 in the support 16 and a bearing 24 on the horizontal part 13 of the bracket 6. A Cardan joint 25 connects the rod 22 with a rod 26 rotatably and slidably journaled in bearings 27 and 28 on a vertically positioned member 29 which is bolted, or otherwise secured, to a casing 30 on the tractor.

Rigidly attached to the rod 26, between the bearings 27 and 28, is an upstanding arm 31 having its upper portion bent substantially horizontal and provided with an opening in which the gear shift lever 32 is loosely held. The lever 32 operates in a T slot 33 in the top of the casing 30. The free end 34 of the rod 22 is cranked to provide a hand hold, for the operator of the combined machines, by which the rod 22 can be rocked to move the lever 32 laterally of the tractor and by which it can be slidably moved longitudinally to rock the lever 32 fore and aft through the action of the arm 31, when it is desired to shift the gears.

Provided with a loop 36, within easy reach of the operator, is a rope or cable 37 which extends forwardly through the hole 20 in the arm 19 and is connected to the clutch lever 38. A similar rope or cable 39 has a loop 40 and extends through the hole 21 in the arm 19 and forwardly through the swallow and over the sheave of a block 40, mounted on a vertical support 41, rigidly secured preferably on the rear of the tractor, and from thence passes through a similar block 42 and rearward to connection with the clutch lever 38. A vertical support 43 is mounted on the rear of the tractor, is similar to the support 41, and carries a block 44 through which the cable 37 passes to the clutch lever 38. Both supports 41 and 43 are held firmly upright by suitable braces 45.

The throttle lever 46 is operable in a manner similar to that employed to control the clutch lever 38; a loop 47 is formed on the rear end of a cable 48 which passes forwardly through the hole 18 in the support 16 and thence forwardly through a guide loop 49, formed on a post 50 secured on the support 43, to the throttle lever 46 to which it is attached. A cable 51 is attached to the throttle lever 46 opposite the attachment of the cable 48 therewith, and extends forwardly through a block 52, mounted on the tractor, and running rearwardly passing through the loop 49 and through the hole 21 in the arm 19 and terminating in a loop 53. To support the drag of the cables a U-shaped member 54 is provided and located forwardly of the binder where it is secured in place by rods or braces 55, 56 and 57 extending from the bracket 6; all of the cables are supported on the U-shaped member and are freely movable thereon.

The facility with which the tractor can be readily controlled by an operator on the seat of the harvester is clearly evident, for by rocking the rod 22 the rod 26 is rocked simultaneously and the arm 31 operates to move the lever 32 laterally of the tractor and into the fore and aft portion of the slot 33, and by a longitudinal movement of the rod 22 the lever 32 is rocked in the desired direction, from this operation the lever 32 is returned to the neutral position, as shown in Figure 2, by rocking the rod 22. Steering the tractor is accomplished by operation of the wheel 9 imparting a similar rotation to the wheel 10. The throttle lever 46 is rocked in one direction by a pull on the cable 48, and in the opposite direction by pulling the cable 51, and the clutch lever 38 is rocked in a similar manner by the cables 37 and 39, the loops or hand holds at the end of the cables providing a convenient means, close to the seat 3, by which the operator can actuate the cable for the purpose desired.

What we claim is—

The combination with a tractor and an object to be drawn, of means to operate the gear shift lever of the tractor, said means comprising a rod rotatably and slidably mounted on said object, a casing through which the gear shift lever extends, an inverted arch shaped support rigidly mounted on the casing, a rod rotatably and slidably journaled in bearings on the arch, a Cardan joint connecting said rods, an arm rigidly secured on the second mentioned rod and extending at an upward inclination therefrom and connected to said lever whereby said lever is rocked laterally or longitudinally of the tractor by operation of said rods.

LOUIS W. WITRY.
ROBERT C. LIVESAY.